United States Patent [19]
Jacobs

[11] Patent Number: 6,043,898
[45] Date of Patent: Mar. 28, 2000

[54] METHOD AND SYSTEM FOR CONCURRENTLY EXECUTING MULTIPLE SPOOLING SYSTEMS IN A NETWORKED COMPUTER SYSTEM

[75] Inventor: Norman A. Jacobs, Colorado Springs, Colo.

[73] Assignee: Sun Microsystems, Inc., Palo Alto, Calif.

[21] Appl. No.: 08/658,890

[22] Filed: May 31, 1996

[51] Int. Cl.[7] .................................................. G06F 15/00
[52] U.S. Cl. ........................................ 358/1.15; 358/1.16
[58] Field of Search ................................... 395/114, 112, 395/113, 101, 115, 116, 110, 500.44, 500.45; 358/407, 468, 1.15, 1.13, 1.14, 1.1, 1.16, 1.17, 1.11; 709/203, 213, 214, 215, 223; 710/8, 15, 52, 62, 64

[56] References Cited

U.S. PATENT DOCUMENTS

| | | | |
|---|---|---|---|
| 5,220,674 | 6/1993 | Morgan et al. | 395/110 |
| 5,467,434 | 11/1995 | Hower, Jr. et al. | 395/114 |
| 5,625,757 | 4/1997 | Kageyama et al. | 395/114 |

*Primary Examiner*—Dov Popovici
*Attorney, Agent, or Firm*—McDermott, Will & Emery

[57] ABSTRACT

A system for concurrently executing multiple spooling systems having access to the same endpoint for communications in a networked computer system. The computer system includes a client and a server connected to one another via a network. The server includes a print protocol adaptor and a plurality of spooling systems. The print protocol adaptor includes a front-end and a plurality of translators. Each type of spooling system requires a corresponding translator. A plurality of printers is connected to the plurality of spooling systems. Each printer requires a corresponding spooling system. In order to request a print action, the client sends a print request to the server over the network. The print request is in a format specified by the print protocol the client is using. The front-end, based on the destination printer of the print request, determines to which translator the print request should be sent and then sends the print request to the appropriate translator. The translator translates the print request into a format specified by the print protocol the spooling system that handles print requests for the destination printer was designed using and understands, if necessary, and then sends the print request to the appropriate spooling system.

13 Claims, 8 Drawing Sheets

METHOD AND SYSTEM FOR CONCURRENTLY EXECUTING MULTIPLE SPOOLING SYSTEMS IN A NETWORKED COMPUTER SYSTEM

FIELD OF THE INVENTION

The present invention relates generally to a method and system for concurrently executing multiple spooling systems in a networked computer system and, more particularly, to a method and system for concurrently executing multiple spooling systems having access to the same endpoint for communications in a networked computer system.

BACKGROUND OF THE INVENTION

Networked computer systems enable users to share resources, such as printers. A user at one computer can print on a printer connected to another computer. The computer using the resources of another computer is typically known as a client, and the computer providing resources to another computer is typically known as a server.

FIG. 1 illustrates a known networked computer system 10 that supports network printing. The computer system 10 includes a client 12 and a server 14 connected to one another via a network 16. The server 14 includes a spooling system 18. The spooling system 18 is connected to a printer 20. The spooling system 18 is responsible for receiving a print request from the client 12, processing the print request, and, if necessary, communicating with the printer 20 to complete the print request.

In order to effectively support network printing, the client 12 and the server 14 (in particular, the spooling system 18) must be able to communicate with one another. In other words, the spooling system 18 must be able to understand the print request that the client 12 sends to it. A number of print protocols have been established for the print request. These print protocols specify a format to which the print request must conform so that both the client 12 and the spooling system 18 can understand one another. One such print protocol is known as the Berkeley Print Protocol or the Line Printer Daemon Protocol ("LPD Protocol"). This protocol is described in the Internet Engineering Task Force Request For Comments 1179 ("RFC 1179") and is currently the most widely used print protocol. The LPD Protocol as described in RFC 1179 will be referred to as the "RFC 1179 LPD Protocol."

In addition to specifying a format to which the print request must conform, the print protocols specify an endpoint for communications (e.g., a port) for the print request. Clients sending print requests using a particular print protocol must send them to the endpoint for communications specified by the protocol, and spooling systems receiving and processing print requests using a particular print protocol must listen for and receive them at the specified endpoint for communications. For example, clients sending print requests using the RFC 1179 LPD Protocol must send them to port 515, and spooling systems receiving and processing print requests using the RFC 1179 LPD Protocol must listen for and receive them at port 515. Only a single spooling system can listen for and receive print requests at a given endpoint for communications.

While the RFC 1179 LPD Protocol is widely used and understood by many spooling systems, some spooling systems have been designed using print protocols other than the RFC 1179 LPD Protocol. As a result, some servers may include spooling systems that were not designed using, and do not understand, the RFC 1179 LPD Protocol. In this situation, in order to accommodate clients that are sending print requests using the RFC 1179 LPD Protocol, a process has been added to the server. This process receives the print request from the client, translates the print request into a format that is recognizable by the spooling system, and then sends the translated print request to the spooling system. The addition of such a process enables the server to include and use a spooling system that was not designed using, and does not understand, the RFC 1179 LPD Protocol, even when clients are sending print requests using the RFC 1179 LPD Protocol.

Spooling systems offer different features and have different capabilities. Consequently, in addition to being able to include and use a spooling system that was not designed using, and does not understand, the RFC 1179 LPD Protocol, it is desirable for a server to include and concurrently use a multiple number of spooling systems depending on the features and capabilities of the spooling systems. Since each print protocol specifies the endpoint for communications for print requests using the print protocol, and since only a single spooling system can listen for and receive print requests at a given endpoint for communications, known computer systems only allow a multiple number of spooling systems to concurrently execute if they are using different print protocols (and thus, are listening for and receiving print requests at different endpoints for communications). Known computer systems do not allow a multiple number of spooling systems to concurrently execute if they are using the same print protocol. However, there is a desire to have a multiple number of spooling systems that use the same print protocol to concurrently execute so that the server can use whichever spooling system is most appropriate based on the features and capabilities of the spooling systems. Therefore, a need exists for a computer system that enables a multiple number of spooling systems to concurrently execute having access to the same endpoint for communications.

SUMMARY OF THE INVENTION

The preferred embodiment of the present invention provides a method and system for concurrently executing multiple spooling systems having access to the same endpoint for communications in a networked computer system. Using such a method and system, servers can include and concurrently use a multiple number of spooling systems offering a variety of different features and having a variety of different capabilities. Moreover, servers can handle print requests more efficiently since multiple spooling systems may concurrently process multiple print requests.

The computer system includes a client and a server connected to one another via a network. The server includes a print protocol adaptor and a plurality of spooling systems. The print protocol adaptor includes a front-end and a plurality of translators. Each type of spooling system requires a corresponding translator. A plurality of printers is connected to the plurality of spooling systems. Each printer requires a corresponding spooling system. The spooling system handles all print requests for the printer.

In order to request a print action, the client sends a print request to the server over the network. The print request is in a format specified by the print protocol the client is using to send the print request. The print protocol adaptor, and in particular, the front-end of the print protocol adaptor, receives the print request from the client. The front-end, based on the destination printer of the print request, determines to which translator the print request should be sent and then sends the print request to the appropriate translator. Upon receiving the print request from the front-end, the translator translates the print request into a format specified by the print protocol the spooling system that handles print requests for the destination printer was designed using and understands, if necessary. After receiving and, if necessary, translating the print request, the translator sends the print request to the appropriate spooling system. The spooling system then processes the print request and, if necessary, queues the print request.

After the spooling system has processed the print request, and if necessary, queued the print request, the spooling system sends a return message to the translator. Upon receiving the return message from the spooling system, the translator translates the return message into the format specified by the print protocol the client used to send the print request, if necessary. After receiving and, if necessary, translating the return message, the translator sends the return message to the front-end. Lastly, the front-end sends the return message to the client over the network.

DETAILED DESCRIPTION OF THE PREFERRED EMBODIMENT

The preferred embodiment of the present invention provides a method and system for concurrently executing multiple spooling systems having access to the same endpoint for communications in a networked computer system. Using such a method and system, servers can include and concurrently use a multiple number of spooling systems offering a variety of different features and having a variety of different capabilities. Moreover, servers can handle print requests more efficiently since multiple spooling systems may concurrently process multiple print requests.

Figure 1:
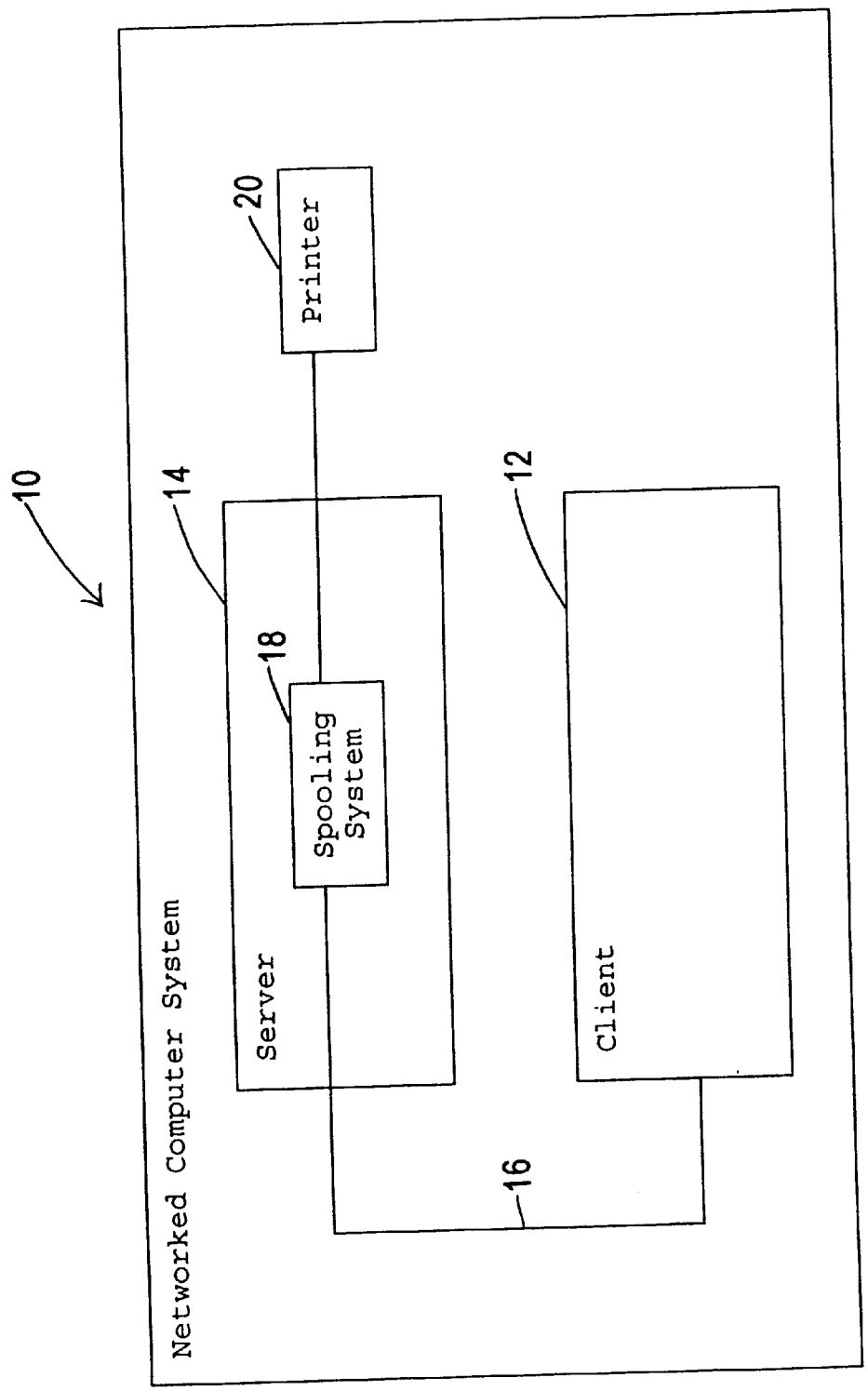
FIG. 1 is a block diagram illustrating the components of a known networked computer system.
Figure 2:
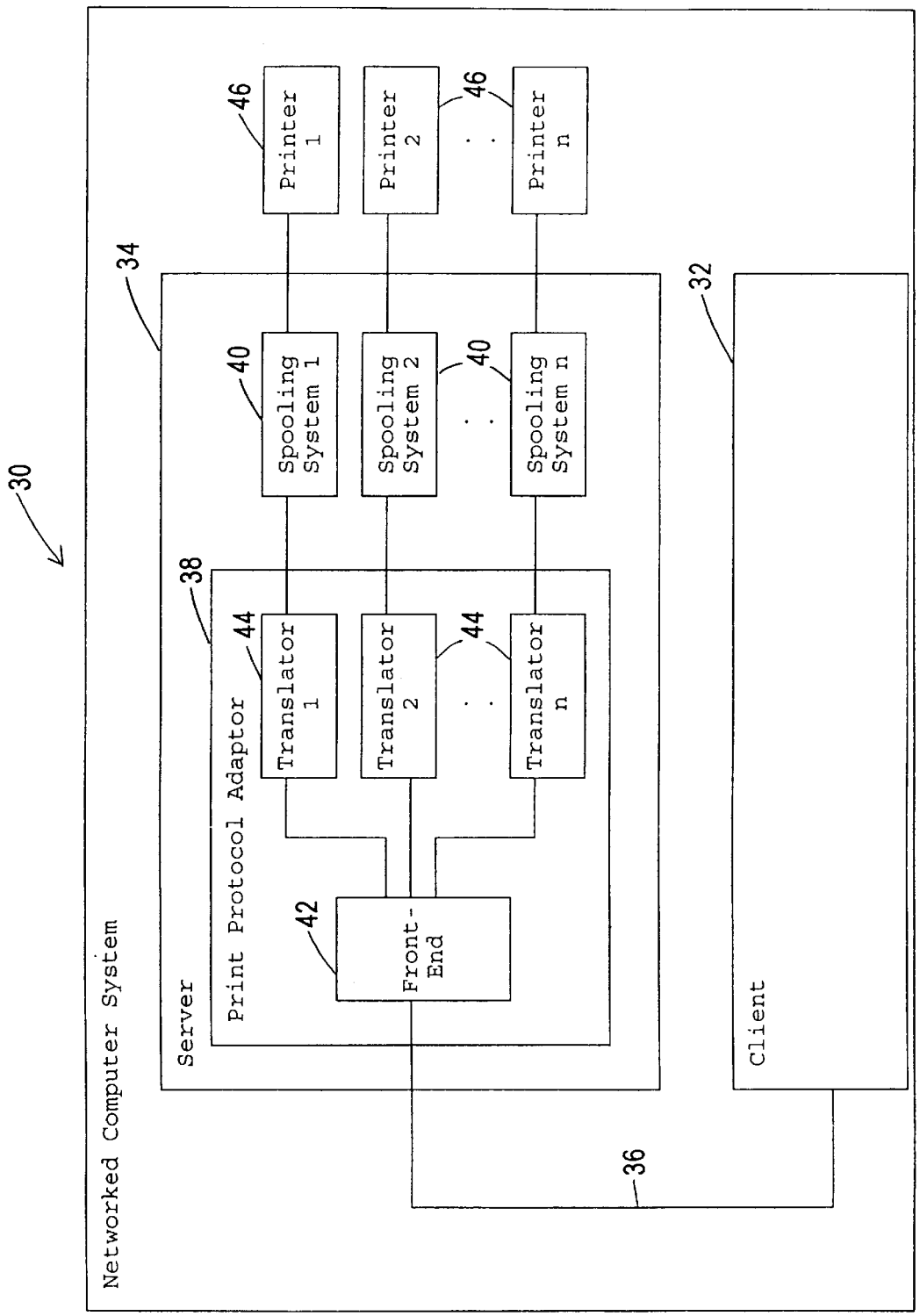
FIG. 2 is a block diagram illustrating the components of a networked computer system in which the preferred embodiment of the present invention operates.

A networked computer system 30 in which the preferred embodiment of the present invention operates is illustrated in FIG. 2. The networked computer system 30 includes a client 32 and a server 34. The client 32 is any computer requesting printing services, and the server 34 is any computer providing printing services. The client 32 and the server 34 are connected to one another via a network 36. The client 32 and the server 34 typically include a central processing unit and storage (not separately shown). Additionally, the client 32 and the server 34 typically are connected to any number of input/output ("I/O") devices, such as monitors, keyboards, printing devices, and storage devices (not separately shown). These components of the client 32 and the server 34 are well-known in the art and will not be discussed in greater detail.

For the sake of simplicity, the networked computer system 30 of the present invention has been illustrated with a single client 32 and a single server 34. However, one of ordinary skill in the art will appreciate that the networked computer system 30 could include any number of clients and any number of servers (and typically, would include a multiple number of clients and a multiple number of servers). Each additional client and server would be connected to the others via the network 36 and would include components similar to those discussed above in connection with the client 32 and the server 34.

The server 34 of the present invention includes a print protocol adaptor 38 and a plurality of spooling systems 40. The print protocol adaptor 38 includes a front-end 42 and a plurality of translators 44. Each type of spooling system 40 requires a corresponding translator 44. A plurality of printers 46 is connected to the plurality of spooling systems 40. Each printer 46 requires a corresponding spooling system 40. The spooling system 40 handles all print requests for the printer 46. Generally, the spooling system 40 is responsible for queuing print jobs, transforming data, and communicating with the printer 46.

In one embodiment of the present invention, the client 32 can request any of the following actions from the server 34 in connection with a print job (or a set of print jobs):

(1) Transfer job;

(2) Print job;

(3) Get status of job; and (4) Cancel job;

In order to request a particular action, the client 32 sends a print request to the server 34.

The print request generally includes the following components: (1) an on the wire protocol request, and (2) a print job (or a set of print jobs). The on the wire protocol request is typically in the following format:

char printer name arguments where char is a character representing the requested action, printer name is the name of the destination printer 46, and arguments is a list of arguments needed to complete the requested action. The print job is typically a group of files including: (1) a data file(s) containing the data to be printed, if necessary, and (2) a control file(s) containing information regarding the print job, such as the name of the user, the name of the computer from which the user is requesting the action (i.e., the name of the client 32), and the name(s) of the data file(s) and their type(s). One of ordinary skill in the art will appreciate that the specific format of the print request will depend upon and be specified by the print protocol used to send and receive the print request.

Figure 3A:
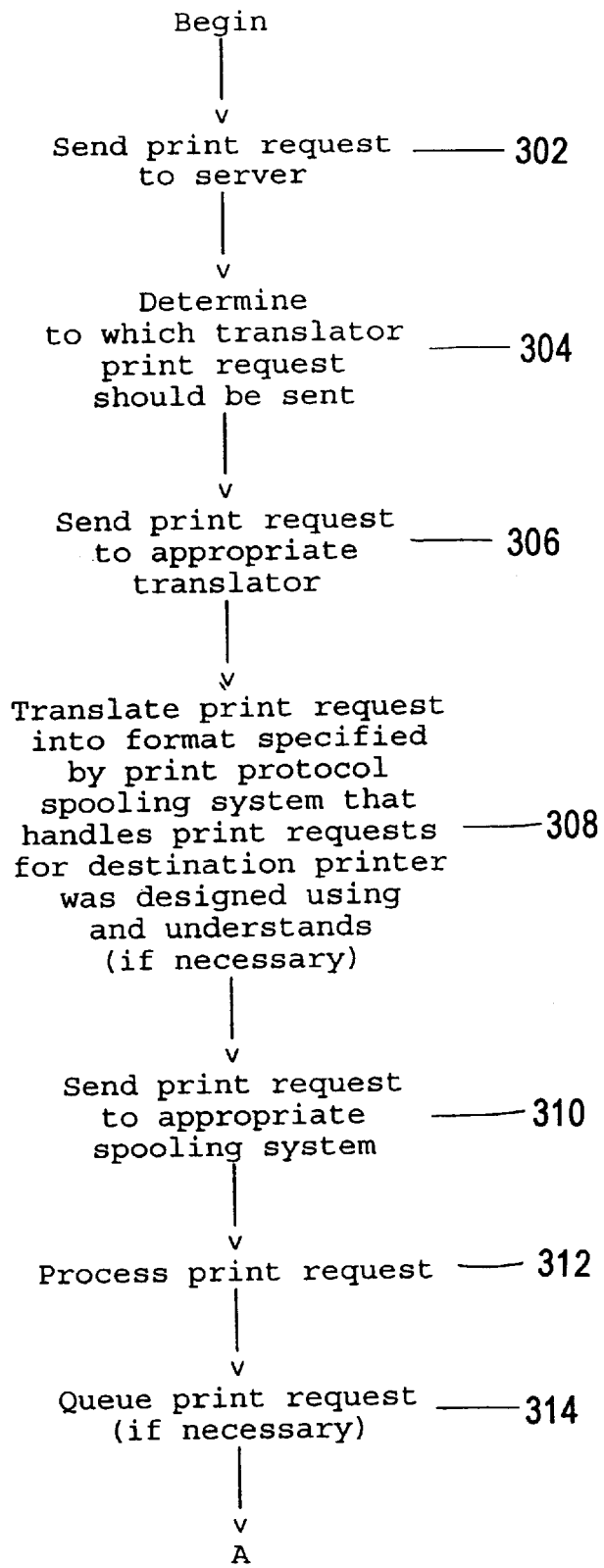
FIGS. 3A and 3B collectively are a flowchart generally illustrating the preferred steps performed in the operation of the computer system of FIG. 2.
Figure 3B:
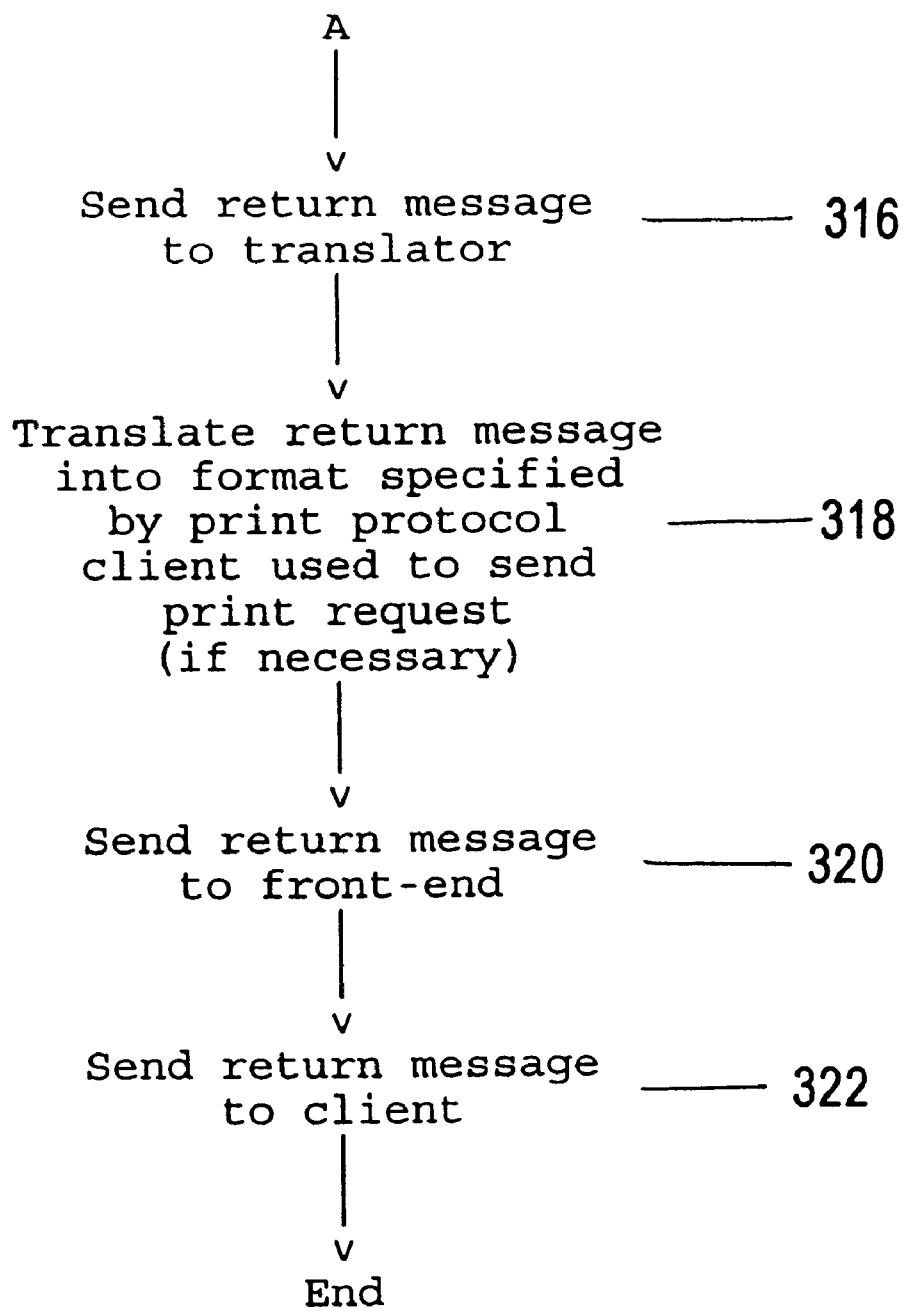

FIGS. 3A and 3B generally illustrate the preferred steps performed in the operation of the computer system of the present invention. Initially, the client 32 sends a print request to the server 34 over the network 36 (step 302). The print request is in a format specified by the print protocol the client 32 is using to send the print request. The client 32 sends the print request to an endpoint for communications specified by the print protocol. For example, the endpoint for communications specified by the RFC 1179 LPD Protocol is port 515.

The print protocol adaptor 38, and in particular, the front-end 42 of the print protocol adaptor, receives the print request from the client 32 at the specified endpoint for communications. The front-end 42, based on the destination printer 46 of the print request, determines to which translator 44 the print request should be sent (step 304) and then sends the print request to the appropriate translator (step 306).

Upon receiving the print request from the front-end 42, the translator 44 translates the print request into a format specified by the print protocol the spooling system 40 that handles print requests for the destination printer 46 was designed using and understands (step 308). This step is generally performed if the print protocol used to send and receive the print request is different than the print protocol the spooling system 40 was designed using and understands. Additionally, the translator 44 may perform various pre-processing functions in connection with the print request. After receiving and, if necessary, translating and preprocessing the print request, the translator 44 sends the print request to the appropriate spooling system 40 (step 310). The spooling system 40 then processes the print request (step 312) and, if necessary, queues the print request (step 314).

After the spooling system 40 has processed the print request, and if necessary, queued the print request, the spooling system sends a return message to the translator 44 (step 316). Upon receiving the return message from the spooling system 40, the translator 44 translates the return message into the format specified by the print protocol the client 32 used to send the print request (step 318). Again, this step is generally performed if the print protocol used to send and receive the print request is different than the print protocol the spooling system 40 was designed using and understands. Additionally, the translator 44 may perform various post-processing functions in connection with the return message. After receiving and, if necessary, translating and post-processing the return message, the translator 44 sends the return message to the front-end 42 (step 320). Lastly, the front-end 32 sends the return message to the client 32 over the network 36 (step 322). This process is essentially the reverse of the process described in the previous paragraph.

The preferred steps performed in the operation of the print protocol adaptor 38, including the front-end 42 and the translators 44, will be described in greater detail in connection with FIGS. 4, 5, 6, and 7. The operation of the spooling systems 40 and the printers 46 is well-known in the art and will not be described in greater detail.

Figure 4:
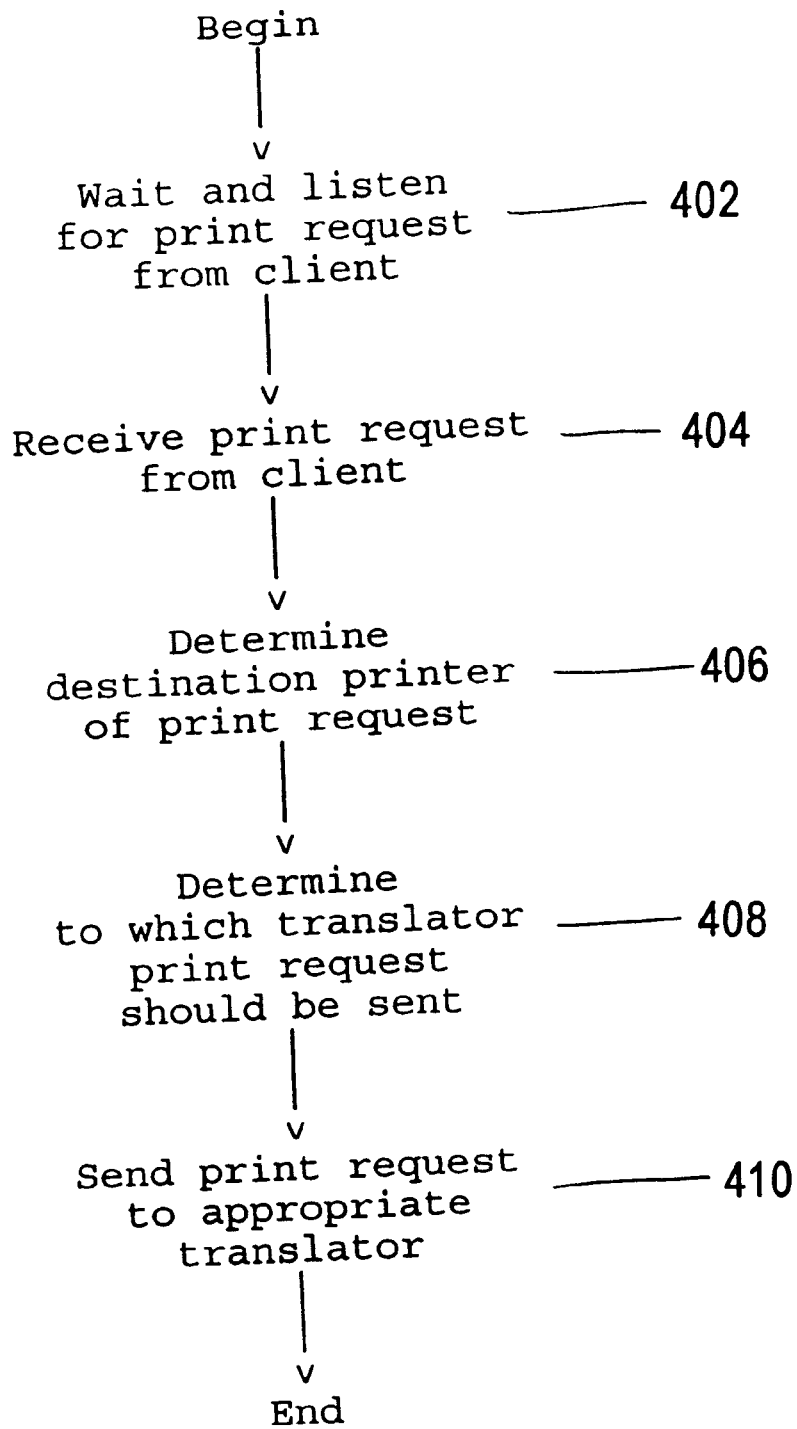
FIGS. 4 and 5 are flowcharts generally illustrating the preferred steps performed in the operation of a front-end component of the computer system of FIG. 2.
Figure 5:
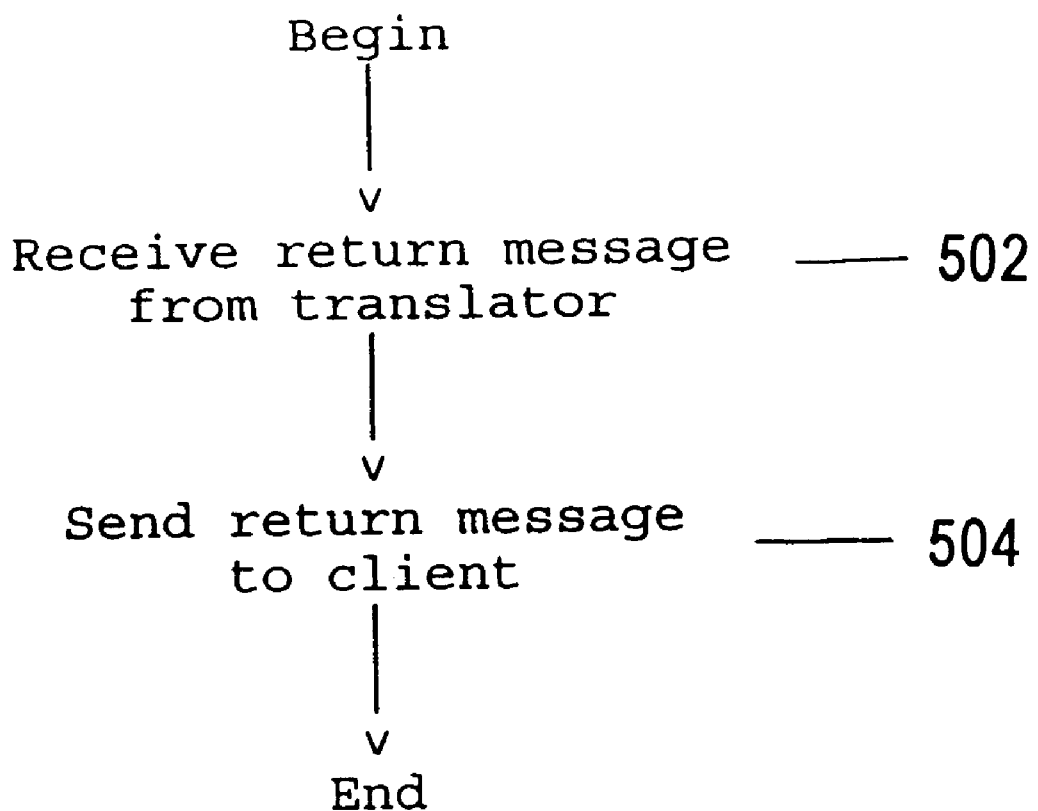

FIGS. 4 and 5 generally illustrate the preferred steps performed in the operation of the front-end 42 of the present invention. Referring to FIG. 4, the front-end 42 of the print protocol adaptor 38 waits and listens for a print request from the client 32 (step 402). The front-end 42 waits and listens for a print request at an endpoint for communications specified by the print protocol the front-end is using to receive print requests (this is the same print protocol the client is using to send print requests). When the client 32 sends a print request to the server 34 over the network 36, the front-end 42 receives the print request at the specified endpoint for communications (step 404). Upon receiving the print request, the front-end 42 determines the destination printer 46 of the print request from the printer name in the print request (step 406). After determining the destination printer 46, the front-end 42 determines to which translator 44 the print request should be sent based on the destination printer (step 408). In a preferred embodiment of the present invention, the front-end 42 determines the appropriate translator 44 by searching a configuration database that lists all of the possible destination printers 46 and the appropriate translator for each printer. After determining the appropriate translator 44, the front-end 42 sends the print request to the translator (step 410).

Referring to FIG. 5, the front-end 42 of the print protocol adaptor 38 receives a return message from the translator 44 (step 502). After receiving the return message, the front-end 42 sends the return message to the client 32 (step 504).

Figure 6:
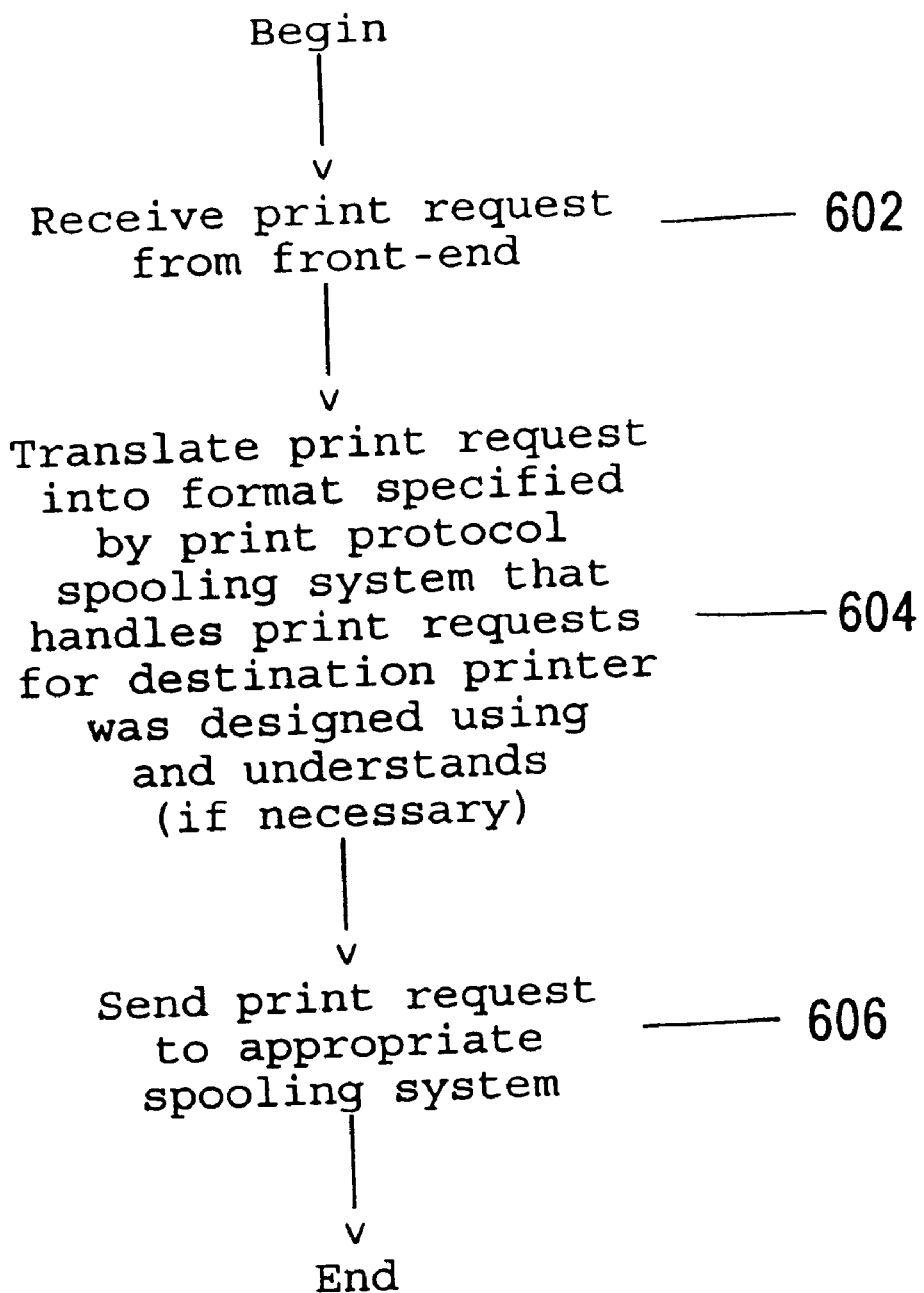
FIGS. 6 and 7 are flowcharts generally illustrating the preferred steps performed in the operation of a translator component of the computer system of FIG. 2.
Figure 7:
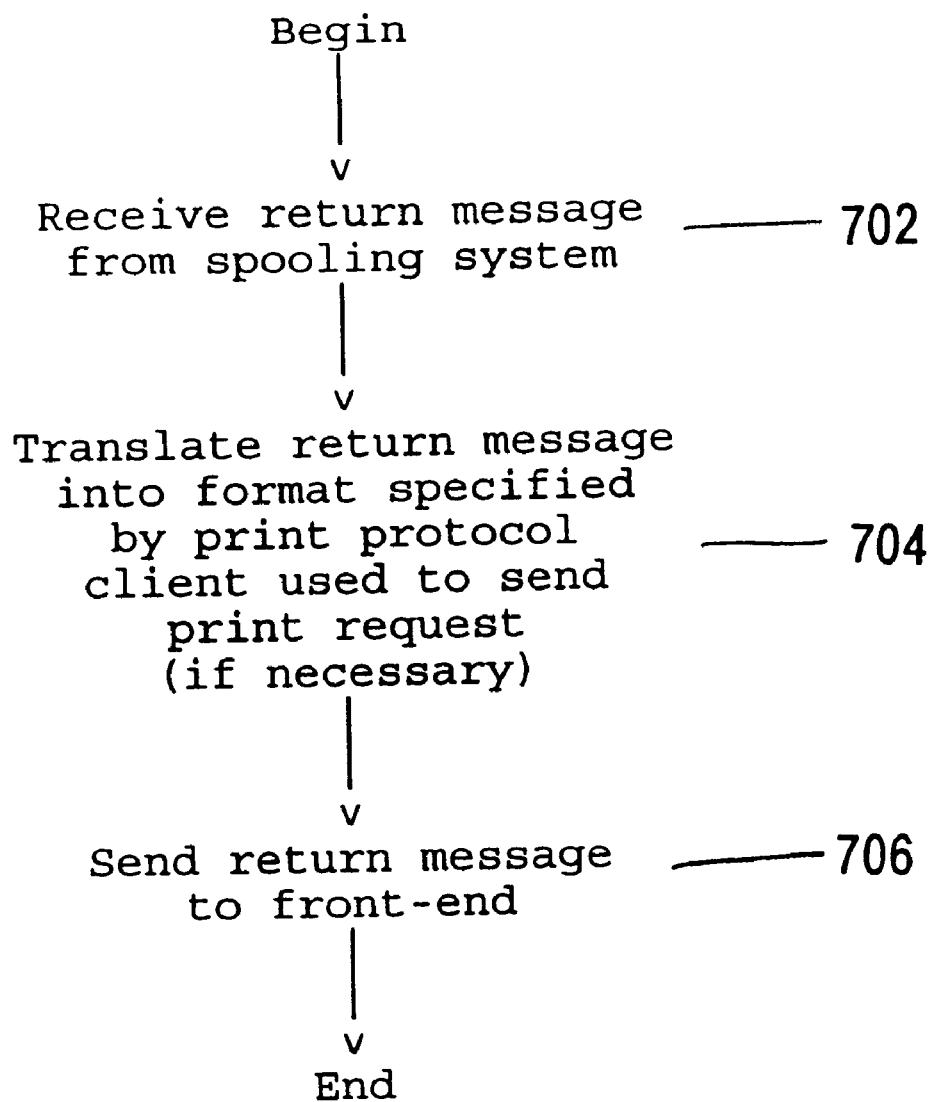

FIGS. 6 and 7 generally illustrate the preferred steps performed in the operation of the translators 44 of the present invention. Referring to FIG. 6, the translator 44 of the print protocol adaptor 38 receives a print request from the front-end 42 (step 602). Upon receiving the print request, the translator 44 translates the print request into the format specified by the print protocol the spooling system 40 that handles print requests for the destination printer 46 was designed using and understands (step 604). As discussed above, this step is generally performed if the print protocol used to send and receive the print request is different than the print protocol the spooling system 40 was designed using and understands. For example, if the print request is in the RFC 1179 LPD Protocol format, but the spooling system 40 was not designed using, and does not understand, the RFC 1179 LPD Protocol, the translator 44 translates the print request into the native print protocol format of the spooling system. Additionally, the translator 44 may perform various pre-processing functions in connection with the print request. After receiving and, if necessary, translating and preprocessing the print request, the translator 44 sends the print request to the appropriate spooling system 40 (step 606).

Referring to FIG. 7, the translator 44 of the print protocol adaptor 38 receives a return message from the spooling system 40 (step 702). Upon receiving the return message, the translator 44 translates the return message into the format specified by the print protocol the client 32 used to send the print request (step 704). Again, this step is generally performed if the print protocol used to send and receive the print request is different than the print protocol the spooling system 40 was designed using and understands. Additionally, the translator 44 may perform various post-processing functions in connection with the return message. After receiving and, if necessary, translating and post-processing the return message, the translator 44 sends the return message to the front-end 42 (step 706).

In a preferred embodiment of the present invention, the front-end 42 and each of the translators 44 are separate modules. Each of the translators 44 is dynamically selected and loaded at run time if and when it is needed. Consequently, if a new type of spooling system 40 is added to the server 34, the entire print protocol adaptor 38 does not have to be modified in order to accommodate the new type of spooling system. Rather, a new translator 44 can be designed and added to accommodate the new type of spooling system 40 and the new translator can be dynamically selected and loaded at run time if and when it is needed.

While the preferred embodiment of the present invention has been described as including a plurality of translators 44, one of ordinary skill in the art will appreciate that the translators may not be necessary in certain circumstances. For example, if the print protocol used to send and receive print requests is always the same as the print protocol the spooling systems 40 were designed using and understand, the translators 44 may not be necessary.

In circumstances where the translators 44 are not necessary and are not included, the operation of the front-end 42 has to be modified. Specifically, after receiving a print request and determining the destination printer 46 of the print request, the front-end 42 determines to which spooling system 40 the print request should be sent based on the destination printer and then sends the print request to the appropriate spooling system (instead of determining to which translator 44 the print request should be sent based on the destination printer and then sending the print request to the appropriate translator). Additionally, the front-end 42 performs any pre-processing and post-processing functions that were performed by the translators 44 in connection with the print request and the return message. Moreover, in circumstances where the translators 44 are not necessary and are not included, the configuration database that the front-end 42 uses has to be modified to list all of the possible destination printers 46 and the appropriate spooling system 40 for each printer (instead of listing all of the possible destination printers and the appropriate translator 44 for each printer). Essentially, in the modified system, the front-end 42 is sending the print request directly to the spooling system 40, rather than indirectly through the translator 44.

One of ordinary skill in the art will now appreciate that the preferred embodiment of the present invention provides a method and system for concurrently executing multiple spooling systems having access to the same endpoint for communications in a networked computer system. Using such a method and system, servers can include and concurrently use a multiple number of spooling systems offering a variety of different features and having a variety of different capabilities. Moreover, servers can handle print requests more efficiently since multiple spooling systems may concurrently process multiple print requests.

Although the present invention has been shown and described with reference to a preferred embodiment, equivalent alterations and modifications will occur to those skilled in the art upon reading and understanding this specification. The present invention includes all such equivalent alterations and modifications and is limited only by the scope of the following claims in light of their full scope of equivalents.

What is claimed is:

1. A method executed in a networked computer system for concurrently executing multiple spooling systems having access to the same endpoint for communications, the computer system including a client and a server connected to one another via a network, the server being connected to at least one printer, the method comprising the steps of:

receiving a print request from the client to complete an action in connection with a print job on a destination printer, the print request being in a format specified by a print protocol that the client understands;

determining a translator that corresponds to the destination printer sending the print request to the translator corresponding to the destination printer, translating the print request into a format specified by a print protocol that a spooling system corresponding to the destination printer understands; and sending the translated print request to the spooling system corresponding to the destination printer.

2. The method of claim 1, wherein the step of receiving a print request from the client to complete an action in connection with a print job on a destination printer includes the step of receiving a print request in a format specified by an RFC 1179 LPD Protocol.

3. The method of claim 2, wherein the step of translating the print request into a format specified by a print protocol that the spooling system corresponding to the destination printer understands includes the step of translating the print request into a format specified by a print protocol other than the RFC 1179 LPD Protocol.

4. The method of claim 1, wherein the step of determining a translator that corresponds to the destination printer includes the step of determining the translator from a database that includes all of the possible destination printers and the corresponding translators.

5. The method of claim 1, further including the steps of:

processing the translated print request;

sending a return message to the translator;

translating the return message into the format specified by the print protocol that the client understands;

sending the translated return message to a front-end; and sending the translated return message to the client.

6. A computer program product for concurrently executing multiple spooling systems having access to the same endpoint for communications in a networked computer system, the computer system including a client and a server connected to one another via a network, the server being connected to at least one printer, the computer product comprising:

computer readable program code configured to receive a print request from the client to complete an action in connection with a print job on a destination printer, the print request being in a format specified by a print protocol that the client understands;

computer readable program code configured to determine a translator that corresponds to the destination printer;

computer readable program code configured to send the print request to the translator corresponding to the destination printer;

computer readable program code configured to translate the print request into a format specified by a print protocol that a spooling system corresponding to the destination printer understands; and computer readable program code configured to send the translated print request to the spooling system corresponding to the destination printer.

7. The computer program product of claim 6, wherein the computer readable program code configured to receive a print request from the client to complete an action in connection with a print job on a destination printer includes computer readable program code configured to receive a print request in a format specified by an RFC 1179 LPD Protocol.

8. The computer program product of claim 7, wherein the computer readable program code configured to translate the print request into a format specified by a print protocol that the spooling system corresponding to the destination printer understands includes computer readable program code configured to translate the print request into a format specified by a print protocol other than the RFC 1179 LPD Protocol.

9. The computer program product of claim 6, wherein the computer readable program code configured to determine a translator that corresponds to the destination printer includes computer readable program code configured to determine the translator from a database that includes all of the possible destination printers and the corresponding translators.

10. The computer program product of claim 6, further including:

computer readable program code configured to process the translated print request;

computer readable program code configured to send a return message to the translator;

computer readable program code configured to translate the return message into the format specified by the print protocol that the client understands;

computer readable program code configured to send the translated return message to a front-end; and computer readable program code configured to send the translated return message to the client.

11. A system for concurrently executing multiple spooling systems having access to the same endpoint for communications in a networked computer, the system comprising:

a client connected to a network; and a server connected to said network and connected to at least one printer, said server including:

at least one spooling system, each said spooling system corresponding to a printer; and a print protocol adaptor, said print protocol adaptor including a front-end configured to receive a print request from said client to complete an action in connection with a print job on a destination printer, the print request being in a format specified by a print protocol that said client understands, at least one translator, each said translator corresponding to a type of said spooling system;

wherein said front-end is further configured to determine said translator that corresponds to said destination printer and send the print request to said translator corresponding to said destination printer; and wherein said translator corresponding to said destination printer is configured to translate the print request into a format specified by a print protocol that said spooling system corresponding to said destination printer understands and send the translated print request to said spooling system corresponding to said destination printer.

12. The system of claim 11, further including a database that includes all possible destination printers and corresponding translators; and wherein said front-end is further configured to determine said translator that corresponds to said destination printer from said database.

13. The system of claim 11, wherein said spooling system corresponding to said destination printer is configured to process the translated print request and send a return message to said translator corresponding to said destination printer;

wherein said translator corresponding to said destination printer is further configured to translate the return message into the format specified by the print protocol that said client understands and send the translated return message to said front-end; and wherein said front-end is further configured to send the translated return message to said client.

* * * * *